United States Patent [19]
Minchey et al.

[11] Patent Number: 5,970,199
[45] Date of Patent: Oct. 19, 1999

[54] FRAME FOR SUPPORTING FIBER OPTIC CABLE SPLICES

[75] Inventors: Justin Minchey, Leonard; Daniel Glaser; James Glaser, both of Bonham, all of Tex.

[73] Assignee: ACT Communications, Inc., Ector, Tex.

[21] Appl. No.: 08/763,228

[22] Filed: Dec. 11, 1996

[51] Int. Cl.⁶ .................................................. G02B 6/38
[52] U.S. Cl. ........................................ 385/134; 385/135
[58] Field of Search ..................... 385/134, 135, 385/138, 147

[56] References Cited

U.S. PATENT DOCUMENTS

| | | | |
|---|---|---|---|
| Re. 34,488 | 12/1993 | Clark | 405/174 |
| Re. 35,020 | 8/1995 | Quinlan, Jr. | 385/13 |
| 3,143,589 | 8/1964 | Brault et al. | 353/6 |
| 3,899,245 | 8/1975 | Bernhardt | 352/72 |
| 3,906,223 | 9/1975 | White | 250/570 |
| 4,170,510 | 10/1979 | Brorein et al. | 156/432 |
| 4,184,070 | 1/1980 | McBruce, Jr. | 250/551 |
| 4,339,658 | 7/1982 | Fromm et al. | 356/73.1 |
| 4,385,801 | 5/1983 | Bubanko | 385/59 |
| 4,414,697 | 11/1983 | Hartley | 7/107 |
| 4,420,123 | 12/1983 | Fox et al. | 310/348 |
| 4,428,645 | 1/1984 | Korbelak et al. | 385/135 |
| 4,526,431 | 7/1985 | Kasukawa | 439/153 |
| 4,535,355 | 8/1985 | Arn et al. | 380/10 |
| 4,606,023 | 8/1986 | Dragoo | 359/120 |
| 4,644,131 | 2/1987 | Richardson | 219/75 |
| 4,690,491 | 9/1987 | Stein et al. | 359/118 |
| 4,695,038 | 9/1987 | Giroux | 254/134.3 FT |
| 4,699,460 | 10/1987 | Szentesi | 385/71 |
| 4,701,907 | 10/1987 | Collins | 370/371 |
| 4,711,520 | 12/1987 | Bernardini | 385/76 |
| 4,727,742 | 3/1988 | Weaver | 72/420 |
| 4,737,614 | 4/1988 | Richardson | 348/90 |
| 4,756,615 | 7/1988 | Hildebrand | 353/74 |
| 4,761,543 | 8/1988 | Hayden | 235/457 |
| 4,779,265 | 10/1988 | O'Connor et al. | 370/441 |
| 4,779,951 | 10/1988 | Bouvard et al. | 385/134 |
| 4,787,710 | 11/1988 | Durell | 385/33 |
| 4,792,849 | 12/1988 | McCalley et al. | 348/7 |
| 4,812,810 | 3/1989 | Query et al. | 340/545 |
| 4,818,975 | 4/1989 | Jenkins | 340/584 |
| 4,821,614 | 4/1989 | Fleet et al. | 83/100 |
| 4,823,305 | 4/1989 | Holdren et al. | 359/850 |
| 4,833,806 | 5/1989 | Gars | 40/447 |
| 4,859,029 | 8/1989 | Durell | 359/629 |
| 4,860,096 | 8/1989 | Long et al. | 348/61 |
| 4,860,286 | 8/1989 | Forsberg et al. | 370/510 |
| 4,871,127 | 10/1989 | Clark | 242/364 |
| 4,896,997 | 1/1990 | Gaylin | 405/156 |
| 4,899,988 | 2/1990 | Mills | 254/292 |
| 4,918,652 | 4/1990 | Bennington et al. | 359/551 |
| 4,918,689 | 4/1990 | Hui | 370/510 |
| 4,957,346 | 9/1990 | Wood et al. | 385/117 |
| 4,970,718 | 11/1990 | Simcoe et al. | 370/434 |
| 4,993,803 | 2/1991 | Suverison et al. | 385/88 |
| 5,013,112 | 5/1991 | Hellwig | 385/147 |
| 5,018,142 | 5/1991 | Simcoe et al. | 341/58 |
| 5,023,934 | 6/1991 | Wheeless | 455/45 |
| 5,025,567 | 6/1991 | McWilliams et al. | 33/366 |
| 5,035,004 | 7/1991 | Koester | 2/9 |
| 5,037,167 | 8/1991 | Beaty | 385/147 |
| 5,038,040 | 8/1991 | Funk et al. | 250/339.02 |
| 5,056,884 | 10/1991 | Quinlan, Jr. | 385/13 |
| 5,059,019 | 10/1991 | McCullough | 352/131 |
| 5,059,784 | 10/1991 | Northrup | 250/237 R |
| 5,061,039 | 10/1991 | Cassidy | 359/894 |
| 5,061,995 | 10/1991 | Lia et al. | 348/68 |
| 5,084,993 | 2/1992 | Dahlheimer | 40/547 |

(List continued on next page.)

*Primary Examiner*—Hung N. Ngo
*Attorney, Agent, or Firm*—Carr & Storm LLP

[57] ABSTRACT

A frame is provided for relieving stress on a cable splice. The frame includes a pair of rails spaced apart to accommodate a splice enclosure. At least one mounting plate is coupled to spaces of the rails for detachably mounting the splice enclosure. A strain relief is coupled to the rails for receiving a cable and isolating the weight of the cable from a splice of the cable disposed within the splice enclosure.

20 Claims, 5 Drawing Sheets

U.S. PATENT DOCUMENTS

| | | | |
|---|---|---|---|
| 5,088,802 | 2/1992 | House | 312/327 |
| 5,100,221 | 3/1992 | Carney et al. | 385/135 |
| 5,110,189 | 5/1992 | Haines | 299/30 |
| 5,111,323 | 5/1992 | Tanaka et al. | 359/139 |
| 5,117,090 | 5/1992 | Askins | 219/222 |
| 5,123,130 | 6/1992 | Sanders | 4/661 |
| 5,127,179 | 7/1992 | Marsh | 42/90 |
| 5,133,039 | 7/1992 | Dixit | 385/135 |
| 5,134,279 | 7/1992 | Lisec | 222/64 |
| 5,136,433 | 8/1992 | Durell | 359/829 |
| 5,142,606 | 8/1992 | Carney et al. | 385/134 |
| 5,148,041 | 9/1992 | Wertheim et al. | 250/559.1 |
| 5,163,745 | 11/1992 | Zagata | 362/32 |
| 5,165,091 | 11/1992 | Lape et al. | 370/216 |
| 5,193,901 | 3/1993 | Stone | 362/32 |
| 5,222,174 | 6/1993 | Miles | 385/118 |
| 5,224,109 | 6/1993 | Krasutsky et al. | 372/29 |
| 5,240,736 | 8/1993 | Wu et al. | 427/10 |
| 5,255,089 | 10/1993 | Dybas et al. | 348/126 |
| 5,255,403 | 10/1993 | Ortiz | 5/658 |
| 5,278,591 | 1/1994 | Trotter | 351/112 |
| 5,285,461 | 2/1994 | Krasutsky et al. | 372/29 |
| 5,295,733 | 3/1994 | LeBegue | 299/30 |
| 5,319,490 | 6/1994 | Ansley | 359/209 |
| 5,321,917 | 6/1994 | Franklin et al. | 451/386 |
| 5,327,514 | 7/1994 | Dujon et al. | 385/115 |
| 5,336,221 | 8/1994 | Anderson | 606/27 |
| 5,337,396 | 8/1994 | Chen et al. | 385/92 |
| 5,339,379 | 8/1994 | Kutsch et al. | 385/135 |
| 5,353,011 | 10/1994 | Wheeler et al. | 340/572 |
| 5,355,238 | 10/1994 | Kight et al. | 359/135 |
| 5,357,249 | 10/1994 | Azaren et al. | 341/100 |
| 5,363,839 | 11/1994 | Lankford | 600/112 |
| 5,392,122 | 2/1995 | Ulanov et al. | 356/372 |
| 5,392,735 | 2/1995 | Xitco, Jr. et al. | 119/712 |
| 5,394,199 | 2/1995 | Flower | 351/206 |
| 5,396,999 | 3/1995 | Sandheinrich | 206/542 |
| 5,402,855 | 4/1995 | Gondouin | 175/21 |
| 5,403,227 | 4/1995 | Franklin et al. | 451/168 |
| 5,428,703 | 6/1995 | Lee | 385/78 |
| 5,442,724 | 8/1995 | Duel | 385/134 |
| 5,447,464 | 9/1995 | Franklin et al. | 451/28 |
| 5,458,019 | 10/1995 | Trevino | 385/134 |
| 5,461,548 | 10/1995 | Esslinger et al. | 362/32 |
| 5,479,553 | 12/1995 | Daems et al. | 385/135 |
| 5,479,554 | 12/1995 | Roberts | 385/37 |
| 5,488,413 | 1/1996 | Elder et al. | 348/13 |
| 5,491,922 | 2/1996 | Sanders | 43/6.5 |
| 5,497,444 | 3/1996 | Wheeler | 385/135 |
| 5,503,059 | 4/1996 | Pacholok | 89/1.11 |
| 5,509,099 | 4/1996 | Hermsen et al. | 385/134 |
| 5,515,466 | 5/1996 | Lee | 385/78 |
| 5,546,495 | 8/1996 | Bruckner et al. | 385/135 |
| 5,550,378 | 8/1996 | Skillicorn et al. | 250/367 |
| 5,551,545 | 9/1996 | Gelfman | 191/12.2 A |
| 5,553,186 | 9/1996 | Allen | 385/135 |
| 5,640,482 | 6/1997 | Barry et al. | 385/135 |
| 5,652,820 | 7/1997 | Glaser et al. | 385/135 |

…

FRAME FOR SUPPORTING FIBER OPTIC CABLE SPLICES

FIELD OF THE INVENTION

The present invention relates in general to fiber optic cable and specifically to a frame for supporting fiber optic cable splices between serial lengths of optical ground wire fiber optic cable run along utility poles or transmission towers.

BACKGROUND OF THE INVENTION

Increased activity in the communications industry has caused an increase in the use of fiber optic cables used for transmission of information. Right of way for new fiber optic cables, however, is difficult to obtain. In many areas, such as mountainous or rough or rocky terrain, it is very difficult or impossible to bury cable under ground. In these cases, it is advantageous to install fiber optic cables in the air, along existing right of ways occupied by utility and power lines strung along transmission towers or light poles.

Aerial cable installations require a very strong cable suitable to withstand the stresses imposed by long spans between towers and windy or icy conditions. Fiber optic cables are not known for their tensile and shear strength, and by themselves are not suitable for aerial installations. It is well known, however, to thread or weave fiber optic cable inside a heavier cable for support. One well known means of adapting fiber optic cable for use in an aerial installation is to use an aluminum or stainless steel tube as a protective conduit surrounding the optical fibers. The tube is then disposed inside the heavy, aluminum-clad steel strands that are strung between transmission towers as ground wires. These ground wires are provided, as an addition to the power lines, to protect the system from lightning strikes and to lessen the chance of high voltages seeking random grounds in the event of failure. The light transmission along the fibers inside the tube is not affected by electrical surges from lightning or otherwise present in the ground wires. The combination of fiber optic cable and heavy ground wire is well known and used throughout the communications industry as Optical Ground Wire ("OPGW") fiber optic cable.

Along with the increased demand for OPGW cable, the needs for splicing successive lengths of OPGW and accessing the internal fibers at various points along the path of transmission have also increased. The inherent differences in the physical characteristics of the ground wire portion and the fiber optic portion of OPGW, along with their different functions, requires different approaches to the way each portion is spliced or connected to a successive length. First, the ground wire portion is rarely intentionally broken because a discontinuity in a ground wire is undesirable. Fiber optic cable, however, often requires breaking and splicing for maintenance or to install dielectric fiber optic cables used for local access and distribution to the system. Second, splicing ground wires is accomplished merely by bringing the wires into electrical contact and securing them together by a clamp. Fiber optic cables, however, must be properly aligned end to end to insure continuity in the signal transmitted through them. Third, a ground wire splice can slip slightly or be twisted after installation without breaking electrical contact. Spliced fiber optic cables must not move relative to each other or their continuity may be broken.

The most important consideration is that the ground wire portion of OPGW is extremely heavy and bulky relative to the light and delicate fiber optic portion. The two portions, however, are not separated along the path of transmission until a splicing point is reached. Therefore, because the heavy ground wire portion is in close proximity to the fiber splice, it may pull at or strain the fiber cable splice, possibly rendering it unusable. Adequate means must therefore be provided to isolate the ground wire portion, and secure it so its weight and bulk will not be transmitted to the fiber splice.

The communications industry uses specialized devices known as splice closures for splicing lengths of OPGW. A well known embodiment of splice closure is cylindrical in form with an end plate sealing each end of the cylinder. A clamp is provided to secure the OPGW and act as a strain relief against the weight of the cable. Some splice closures require a separate clamp as a strain relief, while others are designed with one or more clamps attached to an end plate.

Splices and access points are generally provided at transmission towers. In a typical installation, the end of the first length of OPGW to be spliced is attached to the transmission tower, with an excess portion allowed to hang down from the point of attachment. The end of the next length of OPGW is also attached to the tower, with an excess portion also allowed to hang down from the point of attachment. A jumper cable is provided between the attachment points to maintain electrical continuity for the ground wires only. The ends of the two excess portions hanging from the tower are brought together and prepared for splicing by stripping away a portion of the ground wire and exposing the fiber optic portion. The ground wire portions are then clamped to some form of strain relief, and the fiber portions are spliced to themselves and to any local-access dielectric fiber optic cables that may be required in the specific installation. The fiber optic splices are then contained within the splice closure, protected from the elements. The assembly is then secured to the transmission tower. To access the splice, the splice closure is removed from the tower, and may be lowered to the base of the transmission tower if the excess portions of OPGW are long enough.

Because the typical installation method is to use enough excess OPGW to allow the assembly to be lowered to the base of the tower, a substantial weight of OPGW may be present at the splice. This means the strain relief clamping means is very important. Previous means of clamping the ground wire portion of the OPGW and relieving the strain created by its weight have not proved satisfactory. One well known embodiment of strain relief is a circle clamp fitted around the cylindrical splice closure, with means provided for securing the OPGW to the circle clamp. The circle clamp, which must be of sufficient strength to withstand the weight of the OPGW, tends to deform the enclosure, especially as the OPGW is subjected to windy conditions, or as the assembly is lowered to the ground for maintenance. Another well known embodiment of splice closure has the strain relief clamps built into the end plate of the enclosure. This unnecessarily adds to the mass and size of the enclosure, as the enclosure must be built to withstand the strain of the heavy cable instead of merely providing a secure housing for the fragile fiber connections. Further, because the strain from the weight of the OPGW is directly transmitted to the enclosure, the enclosure may deform over time.

The embodiments used in the industry often require the entire assembly to be disassembled during routine maintenance and service changes because the strain relief clamps are an integral part of the enclosure. Opening the enclosure requires releasing all or some of these clamps. Adding a fiber to the assembly in these cases also means breaking and re-splicing all the fibers in the enclosure, even though the new fiber to be added is often local-access dielectric fiber optic cable without a heavy ground wire jacket.

What is needed is a means for separating the strain generated by the weight of OPGW from the point where the fibers are spliced, and a means for allowing additional fibers to be added to the assembly, or existing fibers to be removed without disturbing the previously assembled portions, or any of the strain relief clamps.

SUMMARY OF THE INVENTION

This invention is a frame for relieving stress on a cable splice comprising a pair of rails spaced apart to accommodate splice enclosures. At least one mounting plate is coupled to and spacing the rails for detachably mounting a selected splice enclosure. A strain relief is included coupled to the rails for receiving a cable and isolating a weight of the cable from a splice of the cable disposed within the splice enclosure.

According to another embodiment of the present invention, an assembly is provided for securing splices of optical ground wire. The assembly includes a frame having an upper end, a lower end, a lower mounting plate and a strain relief bracket attached to the frame at the lower end. The frame also defines a series of mounting holes at the upper end and additionally includes an upper mounting plate selectively attached to the frame at one of the series of mounting holes. A strain relief is included attached to the strain relief bracket for isolating force from an optical groundwire. The assembly further includes a fiber optic cable splicing enclosure having an upper end and a lower end, the upper end of the enclosure mounted to the upper mounting plate and the lower end of the enclosure mounted to the lower mounting plate. The enclosure is provided for enclosing a splice of a cable passed through the strain relief.

The principles of the present invention are also embodied in methods of supporting a cable splice. According to one such method, a cable is spliced. The splice is enclosed in a closure and the enclosure attached to a frame. The cable is secured to a strain relief in the frame and separate from the enclosure to isolate the weight of the cable from the splice.

The principles of the present invention provide substantial advantages over the prior art. Among other things, strain generated by the weight of a cable is isolated from the point where elements of the cable are spliced. Advantageously, this allows for additional fiber or elements to be added to cable assembly or existing fibers or element to be removed without disturbing existing portions of the cable assembly.

The foregoing has outlined rather broadly the features and technical advantages of the present invention so that the detailed description that follows may be better understood. Additional features and advantages of the invention will be described hereinafter which form the subject of the claims of the invention. It should be appreciated by those skilled in the art that the conception and the specific embodiments disclosed may be readily used as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The accompanying drawings, which are incorporated in and form a part of the specification, illustrate the embodiments of the present invention, and, together with the description, serve to better explain the principles of the invention. In the drawings.

It is to be noted that the drawings illustrate only preferred embodiments of the invention and are therefore not to be considered limiting of its scope, for the invention will admit to other equally effective embodiments.

DETAILED DESCRIPTION OF THE INVENTION

The principles of the present invention and their advantages are best understood by referring to the illustrated embodiment depicted in FIG. 1–7, in which like numbers designate like parts.

Figure 1:
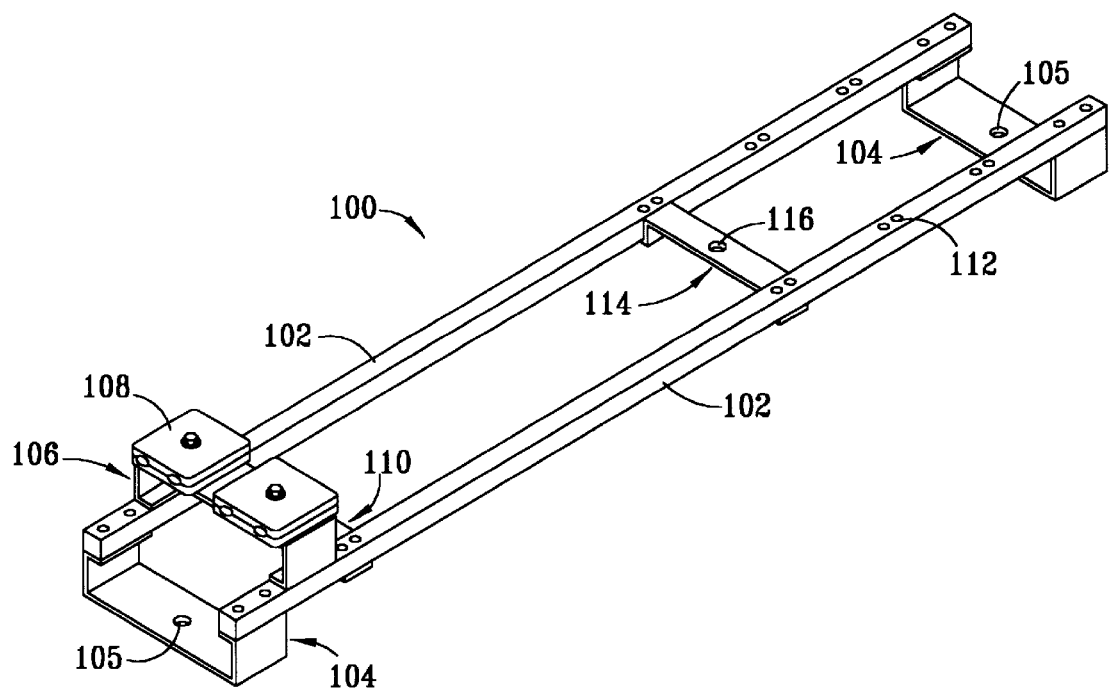
FIG. 1 is a perspective view of a frame for retaining a splice enclosure of Optical Cable Ground Wire according to the principles of the present invention.

There is shown in FIG. 1 the preferred embodiment of a frame 100 for mounting an enclosure for containing and protecting splices of the fibers contained within an Optical Ground Wire fiber optic cable, according to the principles of the present invention. Frame 100 includes a pair of rails 102a and 102b mounted to mounting brackets 104a and 104b. Mounting brackets 104 are provided with at least one mounting hole 105. Rails 102 are preferably formed of steel tubing, though other metallic or non-metallic materials may be used. A strain relief bracket 106 is attached to the lower end of rails 102. Attached to strain relief bracket 106 is at least one cable strain relief 108. Strain relief 108 has an upper portion, a lower portion and a tightening screw, and is used to securely hold a section of Optical Ground Wire fiber optic cable in place. In use, the tightening screw is loosened, separating the upper portion from the lower portion. A section of Optical Ground Wire is inserted between the upper and lower portion, and the screw tightened, which urges the upper and lower portions together and compressing them around the Optical Ground Wire. The weight of the Optical Ground Wire is thereby transferred to the strain relief 108, and the strain relief bracket 106 and the frame 100. Other types of cable strain relief apparatus, known in the art, could be attached to strain relief bracket 106 and used to transfer and isolate the weight of the Optical Ground Wire to the strain relief bracket 106 and frame 100.

A slot is provided in strain relief bracket 106 to allow strain reliefs 108 to be slidably adjusted laterally when installed. A lower mounting plate 110 is mounted to rails 102 adjacent strain relief bracket 106. Rails 102 are provided with a series of holes 112 which allow attaching upper mounting plate 114 to rails 102 in a preselected number of locations along their longitudinal axes. Lower mounting plate 110 and upper mounting plate 114 are each provided with at least one mounting hole 116 (mounting hole 116 in lower mounting plate 110 is not shown).

Mounting brackets 104, strain relief bracket 106, lower mounting plate 110 and upper mounting plate 114 are preferably formed of steel, although other metallic or non-metallic materials may be used. All steel pieces are preferably coated with zinc by the hot-dip galvanizing process to resist rust or other decay from the elements. Other embodiments of the above-mentioned parts of frame 100, if made from materials subject to decay from the elements, may be protected from the elements by painting, plating or the like. The parts of frame 100 may also be formed from aluminum or stainless steel, or other material with a natural resistance to weathering.

Mounting brackets 104, strain relief bracket 106, lower mounting plate 110 and upper mounting plate 114 are preferably attached to rails 102 by stainless steel fasteners such as nuts and bolts, though rivets, welding or other fastening means may be employed. Any treatment process such as hot-dip galvanizing, plating, painting or the like may be performed upon each part of frame 100 separately, or frame 100 may be treated as an assembly. Strain relief 108 is preferably aluminum, although other materials may be used.

Figure 2:
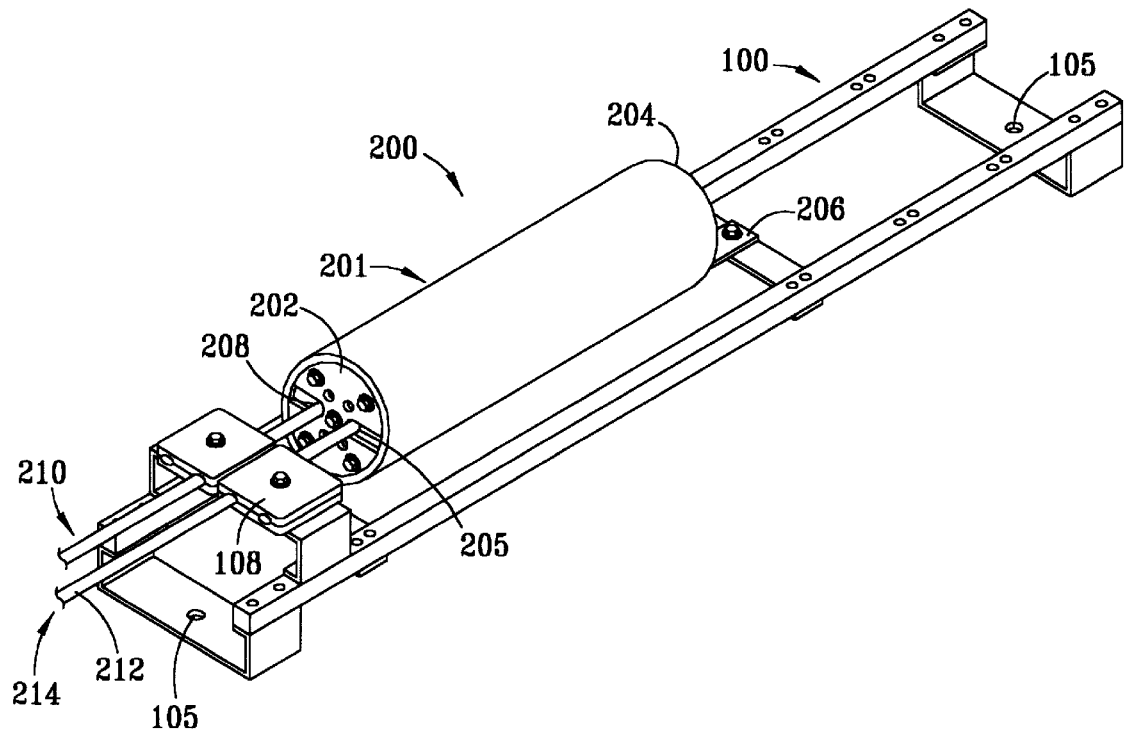
FIG. 2 is a perspective view of the frame of FIG. 1 with a first embodiment of a splice enclosure installed.

In FIG. 2, a first embodiment of frame and enclosure assembly 200 is shown. Assembly 200 includes a frame 100 removably attached to an enclosure 201. Enclosure 201 is sized such that upper mounting plate 114 is inserted in those mounting holes 112 nearest strain relief bracket 106. Enclosure 201 includes entrance end plate 202 and upper end plate 204. Entrance end plate 202 and upper end plate 204 are surrounded by a circumferential seal which may be expanded, sealing the enclosure, or reduced, allowing enclosure 201 to be opened. Entrance end plate 202 includes a preselected number of access holes 205 each through which a fiber optic cable may be inserted. Attached to entrance end plate 202 and upper end plate 204 are foot brackets 206 which are used in connection with a fastener, such as a stainless steel nut and bolt, to attach enclosure 201 to frame 100 via mounting holes 116. In this embodiment foot brackets 206 would be provided with a hole in which to insert the fastener through the foot bracket and holes 116, although other methods of attaching enclosure 201 to frame 100 with foot brackets 206 are possible, such as providing one or more foot brackets 206 with a threaded stud to extend through hole 116 of the corresponding mounting plate 110 or 114.

In use, before enclosure 201 is attached to frame 100, two or more lengths of OPGW fiber optic cables 210 having an outer jacket 212 of ground wire surrounding an aluminum or stainless steel conduit 211 containing optical fibers 214 (not shown) are provided. Two to twelve feet of outer jacket 212 are stripped away, exposing conduit 211. Of that stripped portion, all but three to twelve inches of conduit 211 are subsequently stripped away, leaving optical fibers 214 exposed. OPGW cables 210 are then inserted into strain reliefs 108, which are tightened around the end of outer jacket 212, allowing conduit 211 and optical fibers 214 to extend from the point where OPGW cable 210 is secured to strain relief 108.

Entrance end plate 202 is then separated from enclosure 201 and conduit 211 is threaded through access holes 205. Conduit 211 thus passes through access holes 205 and terminates on the other side of entrance end plate 202 from strain relief 108. After optical fibers 214 are spliced by well known means, enclosure 201 is sealed by re-securing entrance end plate 202. Once sealed, enclosure 201 is attached to frame 100.

Frame and enclosure assembly 200 may then be secured to a transmission tower by inserting stainless steel fasteners (not shown) or other attachment means through holes 105. Alternatively, frame and enclosure assembly 200 may be attached to the transmission tower by banding. One or more dielectric fiber optic cables, used for local access and distribution of the information transmitted by OPGW cable 210, may also be threaded through access holes 205 of entrance end plate 202 of enclosure 201.

Advantageously, after frame and enclosure assembly 200 is secured to a transmission tower or otherwise, strain reliefs 108 isolate the weight of OPGW cable 210 from the splice of optical fibers 214 because the weight of OPGW cable 210 is transferred to frame 100. Frame and enclosure assembly 200 may be moved, reoriented, or temporarily or permanently installed without effect on the splice of optical fibers 214. Enclosure 201 may therefore be smaller and lighter than previous embodiments of splice enclosures because it is not required to withstand the weight of OPGW cable 210.

After OPGW cables 210 are secured to strain reliefs 108, numerous additional fiber optic cables may be inserted in enclosure 201. Enclosure 201, however, is designed to contain a maximum number of fibers. Should the requirements of a specific installation increase the number of fibers to be included in any enclosure beyond the maximum such enclosure is designed to contain, only the enclosure needs to be replaced, and not other components such as frame 100 or strain relief bracket 106.

Figure 3:
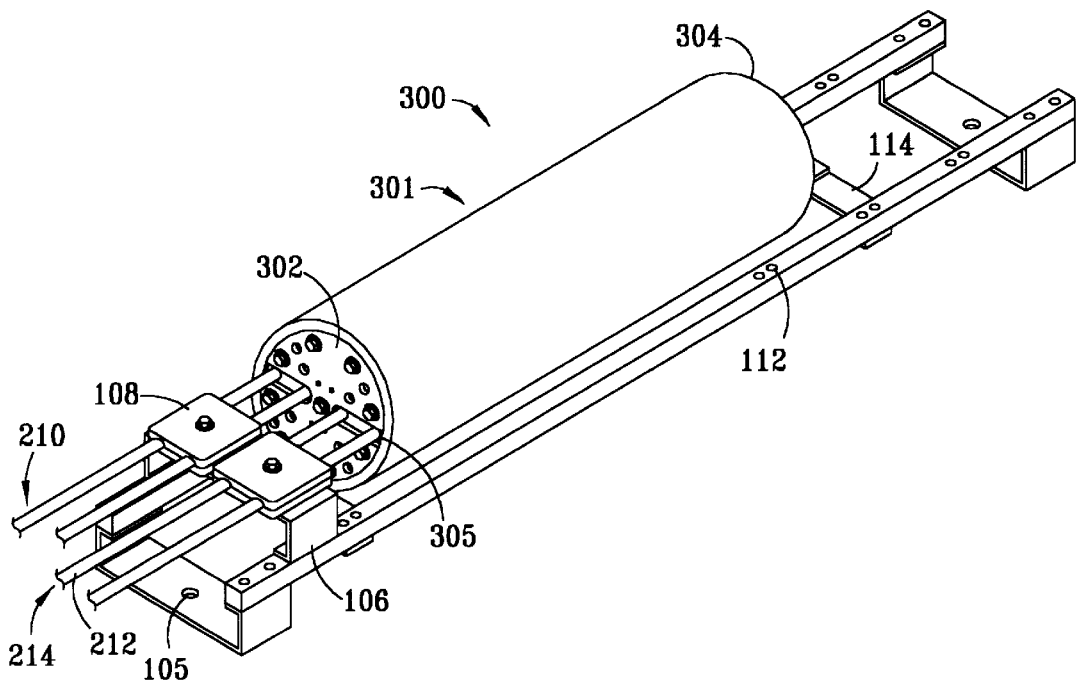
FIG. 3 is a perspective view of the frame of FIG. 1 with a second embodiment of a splice enclosure installed.

There is shown in FIG. 3 a second embodiment of a frame and splicing enclosure assembly 300. In this embodiment, upper mounting plate 114 is attached to frame 100 in the middle set of holes 112 to allow for the size of enclosure 301. Specifically, mounting plate 114 has been adjusted to allow for the extended length of enclosure 301, in light of enclosure 201 of the previous illustration of FIG. 2. Enclosure 301 is larger in diameter than enclosure 201, however frame 100 and lower mounting plate 110 and upper mounting plate 114 allow for and are compatible with the different widths of enclosure 201 and 301. Enclosure 301, being larger in diameter than enclosure 201, accordingly may be used to contain a greater number of OPGW cables 210 and/or OPGW cables 210 of larger diameter. Enclosure 301 includes entrance end plate 302 and upper end plate 304. Entrance end plate 302 includes a number of access holes 305 through which a fiber optic cable may be inserted. Because strain relief bracket 106 is provided with slots, strain reliefs 108 may be moved laterally to align OPGW cables 210 with access holes 305. After OPGW cables 210 are secured to strain reliefs 108 and optical fibers 214 spliced, enclosure 301 is attached to frame 100 in the same manner as previously described.

Figure 4:
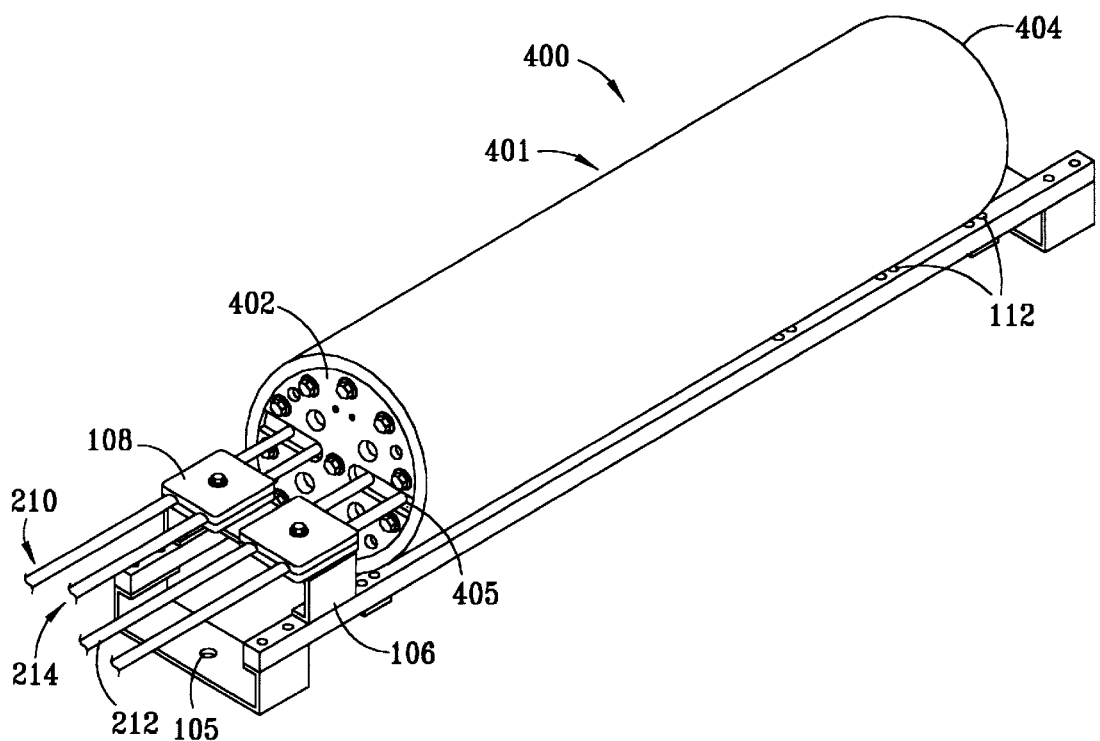
FIG. 4 is a perspective view of the frame of FIG. 1 with a third embodiment of a splice enclosure installed.

There is shown in FIG. 4 a third embodiment of a frame and splicing enclosure assembly 400. In this embodiment, upper mounting plate 114 is attached to frame 100 in the farthest set of holes 112 to allow for the increased length of enclosure 401, vis-a-vis enclosures 201 and 301. Enclosure 401 is larger in diameter than enclosure 201 or enclosure 300, and accordingly may be used to contain a greater number of OPGW cables 210. Frame 100 and lower mounting plate 110 and upper mounting plate 114 allow for and are compatible with the different widths of enclosure 201, 301 and 401. Enclosure 400 includes entrance end plate 402 and upper end plate 404. Entrance end plate 402 includes a number of access holes 405 through which a fiber optic cable may be inserted. Because strain relief bracket 106 is provided with slots, strain reliefs 108 may be moved from side to side to align OPGW cables 210 with access holes 405. After OPGW cables 210 are secured to strain reliefs 108 and optical fibers 214 spliced, enclosure 400 is attached to frame 100 in the same manner as previously described.

Figure 5:
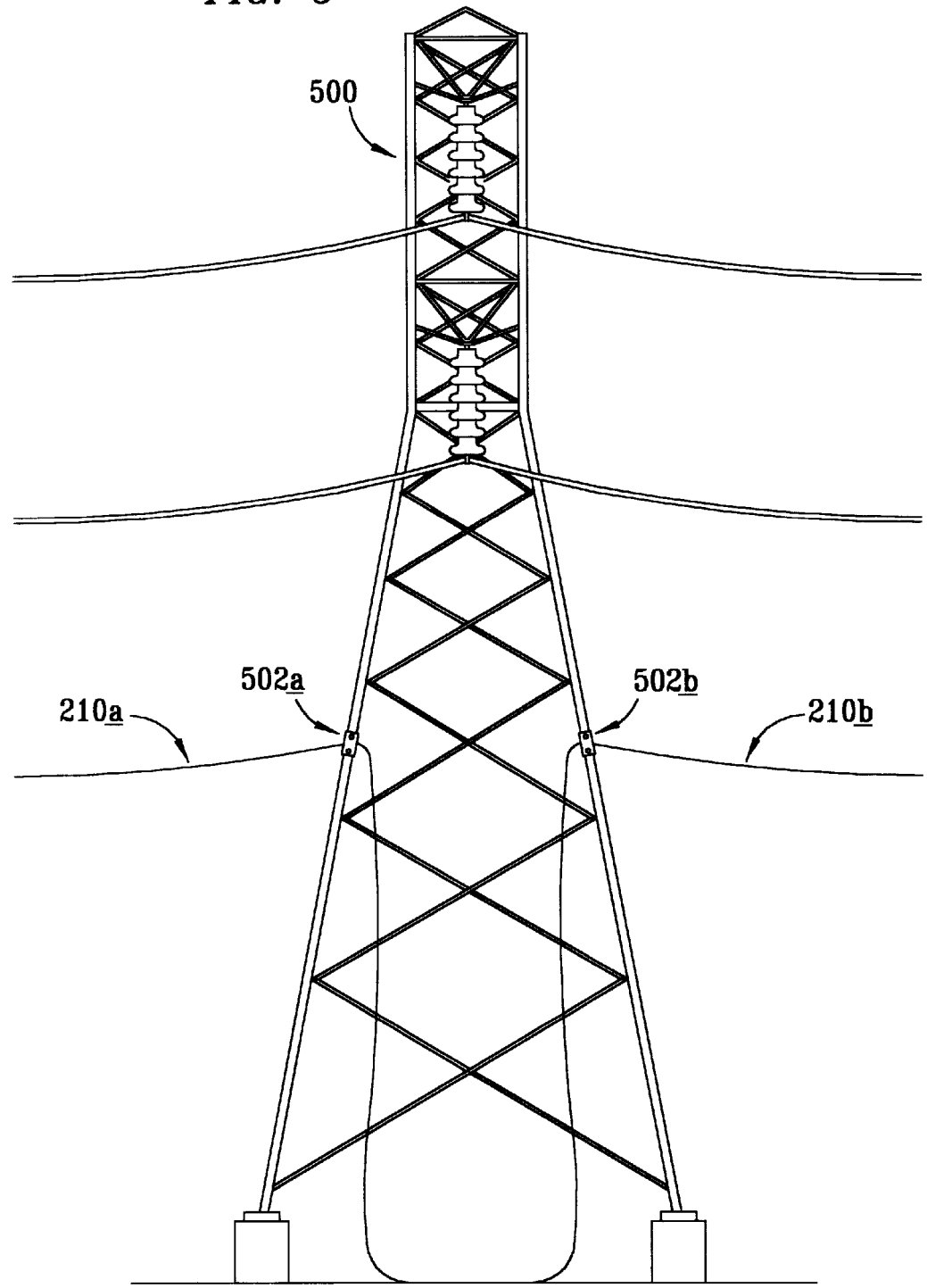
FIG. 5 is a view of a transmission line tower with successive lengths of Optical Cable Ground Wire attached to two legs of a transmission line tower and the portions of each Optical Cable Ground Wire to be spliced hanging from the points of attachment.

There is shown in FIG. 5 a transmission tower 500 with two sections 210a and 210b of OPGW to be spliced. OPGW sections 210a and 210b are attached to transmission tower 500 at attachment points 502a and 502b by conventional means. In a preferred embodiment, enough excess OPGW 210 is allowed to extend beyond attachment points 502 so that the ends of OPGW 210a and 210b sections reach the ground near the base of the tower. A jumper wire may be connected between attachment points 502 to insure electrical continuity between the successive lengths of OPGW 210, although this continuity may also be provided by the metal frame of transmission tower 500.

Figure 6:
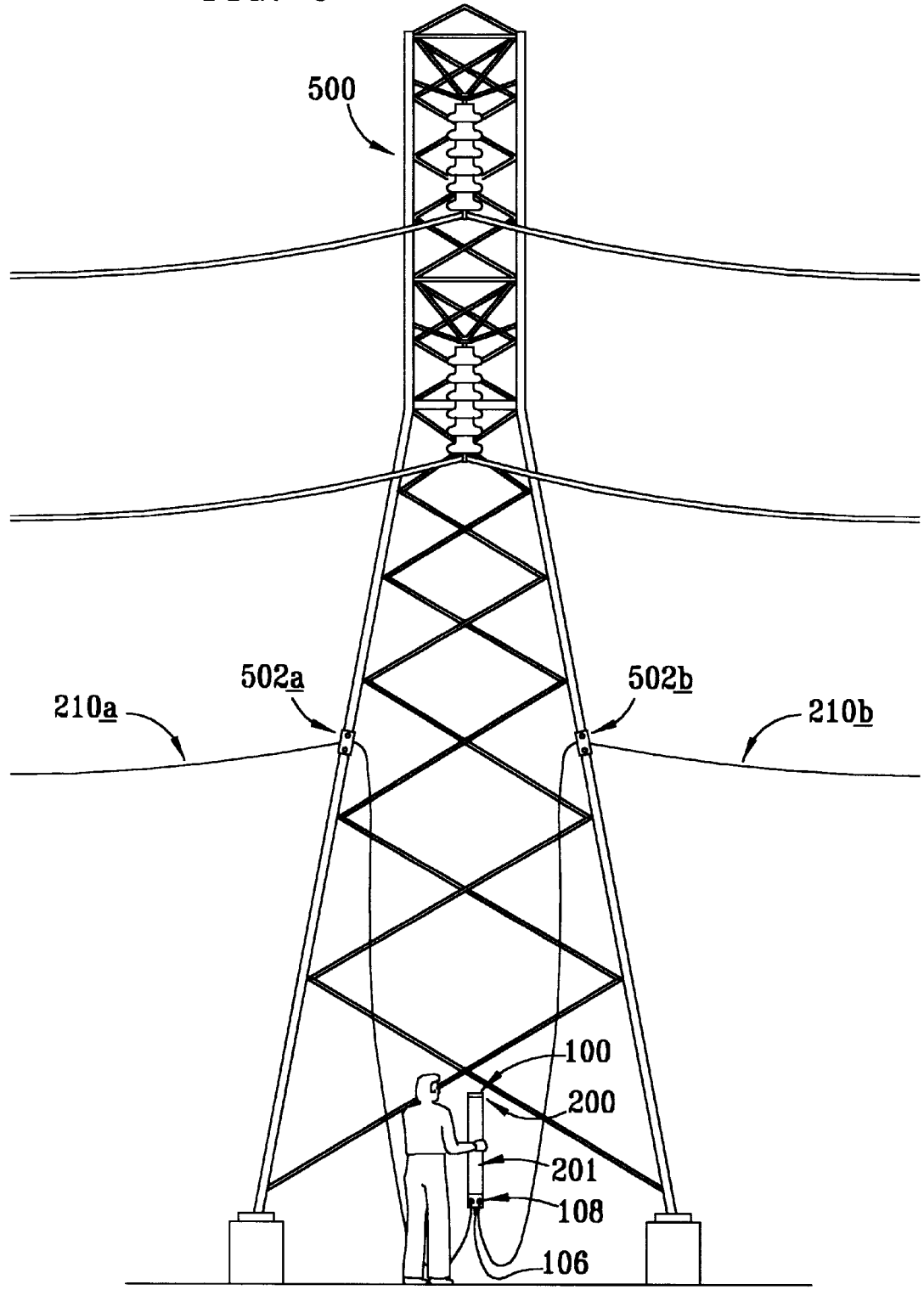
FIG. 6 is a view of the transmission line tower of FIG. 5 with a user standing nearby holding a frame and splice enclosure assembly, after the Optical Ground Wire has been spliced.

In FIG. 6, a user is shown holding frame and enclosure assembly 200 for example (the principles of the present invention as applied in FIG. 6 apply equally as well to embodiments such as assemblies 300 and 400) after successive lengths of OPGW 210 have been spliced. The strain from the weight of OPGW 210 is isolated from enclosure 201 by strain reliefs 108 mounted to strain relief bracket 106 on frame 100.

Figure 7:
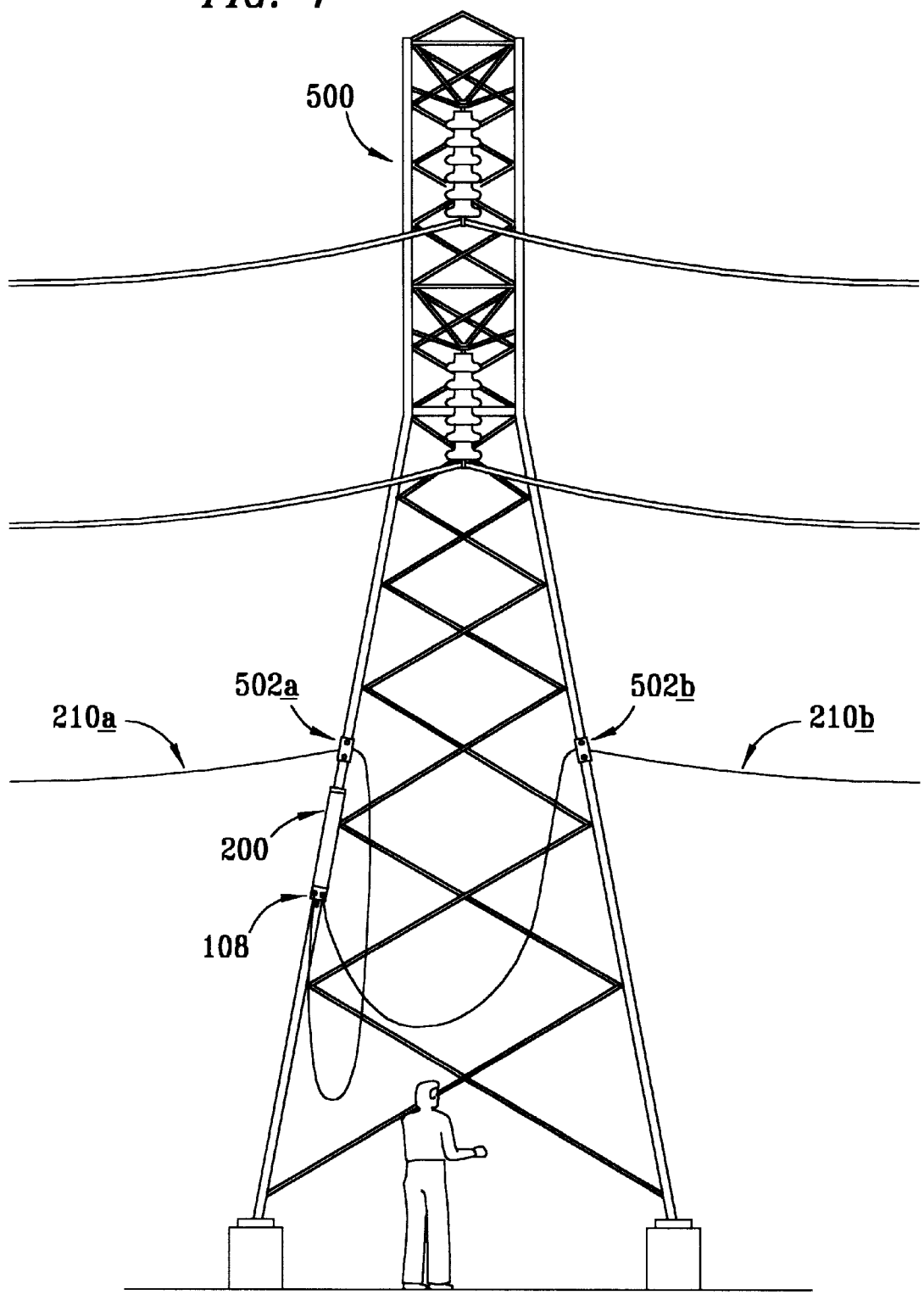
FIG. 7 is a view of the transmission line tower of FIG. 5, with the frame and ground wire installed and excess Optical Ground Wire hanging from the frame.

Referring now to FIG. 7, frame and enclosure assembly 200 is mounted to one of the legs of transmission tower 500. Excess OPGW 210 hangs from frame and enclosure assembly 200. Excess OPGW 210 may be allowed to hang freely from attachment points 502 and strain reliefs 108, or it may be secured to transmission tower 500 by well known means. Advantageously, once assembly 200 is mounted to transmission tower 500, the weight of OPGW 210 is transferred through frame 100 to transmission tower 500, and remains isolated from the splices of the optical fibers 214. Further, assembly 200 may be uncoupled from transmission tower 500 and the splice lowered to the ground for service, or to add or remove OPGW cables or local-access dielectric fiber optic cables.

Although the present invention and its advantages have been described in detail, it should be understood that various changes, substitutions and alterations can be made herein without departing from the spirit and scope of the invention as defined by the appended claims.

What is claimed is:

1. A frame for relieving stress on a cable splice comprising:
    a pair of rails spaced apart to accommodate a splice enclosure;
    at least one mounting plate coupled to and spacing said rails, said mounting plate being configured for securing said splice enclosure; and
    a strain relief coupled to both of said rails for receiving and supporting a cable extending beyond said strain relief to said splice enclosure, and for isolating a portion of the weight of the cable from a splice of the cable disposed within said splice enclosure.

2. The frame of claim 1 wherein said at least one mounting plate comprises a first mounting plate for attaching to a first end of the selected enclosure and a second mounting plate of attaching to a second end of the selected enclosure, said first and second mounting plates spaced apart along a longitudinal axis of said frame.

3. The frame of claim 2 wherein at least one of said first and second mounting plates is adjustable along said longitudinal axis of said frame to accommodate enclosures of varying lengths.

4. The frame of claim 1 further comprising a mounting bracket for attaching said frame to a cable suspension structure.

5. The frame of claim 1 wherein said strain relief is adjustably mounted to a bracket coupled to and spacing said rails.

6. The frame of claim 5 wherein said bracket includes a slot for positioning said strain relief along a horizontal axis of said frame.

7. The frame of claim 2 wherein each of said rails includes a plurality of holes for selectively adjusting at least one of said first and second mounting plates along said longitudinal axis of said frame.

8. The frame of claim 1 wherein said mounting plate includes a mounting hole for receiving means for attaching the enclosure.

9. A method of supporting a cable splice comprising the steps of:
    splicing a break in a cable;
    enclosing the splice in an enclosure;
    attaching the enclosure to a frame; and
    isolating the cable weight external of the enclosure.

10. The method of claim 9 wherein said step of supporting the cable weight from the splice and enclosure comprises the step of supporting the weight with a strain relief attached to said frame and spaced from the enclosure.

11. The method of claim 9, the cable is optical ground wire cable having a core of containing fiber optic cables within a conduit and an outer jacket of strands surrounding the conduit.

12. The method of claim 10, further comprising the steps of:
    providing at least two lengths of optical ground wire cable, each length having an end;
    removing a portion of the outer jacket of the end of the optical ground wire cable to expose a segment of conduit; and
    removing a portion of the conduit to expose a segment of fiber optic cables; wherein the splice is among the fiber optic cables.

13. The method of claim 11, wherein the enclosure has a removable end plate having access holes; and further comprising the steps of:
    removing the end plate; and
    inserting the fiber optic cables and the conduit through the access holes before splicing the fiber optic cables.

14. The method of claim 12, further comprising the step of mounting the frame to transmission tower.

15. An assembly for securing splices of optical ground wire, comprising:
    a frame having an upper end and a lower end, the upper end defining one or more mounting holes;
    a lower mounting plate and a strain relief bracket attached to the frame at the lower end of the frame;
    an upper mounting plate attached to the frame through one of the mounting holes;
    a strain relief attached to the strain relief bracket for isolating force from an optical ground wire; and
    a fiber optic cable splicing enclosure having an upper end and a lower end, the upper end of the enclosure mounted to the upper mounting plate and the lower end of the enclosure mounted to the lower mounting plate, the enclosure for enclosing a splice of a cable passed through the strain relief externally of said splice enclosure.

16. The assembly of claim 15, wherein the strain relief is adapted for receiving a length of optical ground wire, and wherein the weight of the optical ground wire is carried by the strain relief.

17. The assembly of claim 15, wherein the strain relief bracket defines a slot, and the assembly further comprises a fastener used to secure the strain relief to the strain relief bracket, wherein the fastener extends through the slot, allowing the position of the strain relief to be adjusted horizontally with respect to the frame.

18. The assembly of claim 15, wherein the frame is made of steel and is galvanized.

19. The assembly of claim 15, wherein the frame is made of aluminum.

20. The assembly of claim 15, wherein said enclosure has a selected length, at least one of said upper and lower mounting places adjustable to accommodate said length.

* * * * *

UNITED STATES PATENT AND TRADEMARK OFFICE
CERTIFICATE OF CORRECTION

PATENT NO. : 5,970,199
DATED : October 19, 1999
INVENTOR(S) : Minchey et al.

It is certified that error appears in the above-indentified patent and that said Letters Patent is hereby corrected as shown below:

Column 5, line 28    After "204", (1st. occurrence) insert--(not shown)--.

Column 7, line 6     Delete "502"
                     Insert --502a and 502b--

Column 7, line 9     Delete "502"
                     Insert --502a and 502b--

Column 7, line 24    Delete "502"
                     Insert --502a and 502b--

Signed and Sealed this

Sixteenth Day of May, 2000

Attest:

Q. TODD DICKINSON

*Attesting Officer*                *Director of Patents and Trademarks*